INVENTORS
WILLIAM B. GOLDSWORTHY
ETHRIDGE E. HARDESTY

BY *Robert J. Schapp*

ATTORNEY

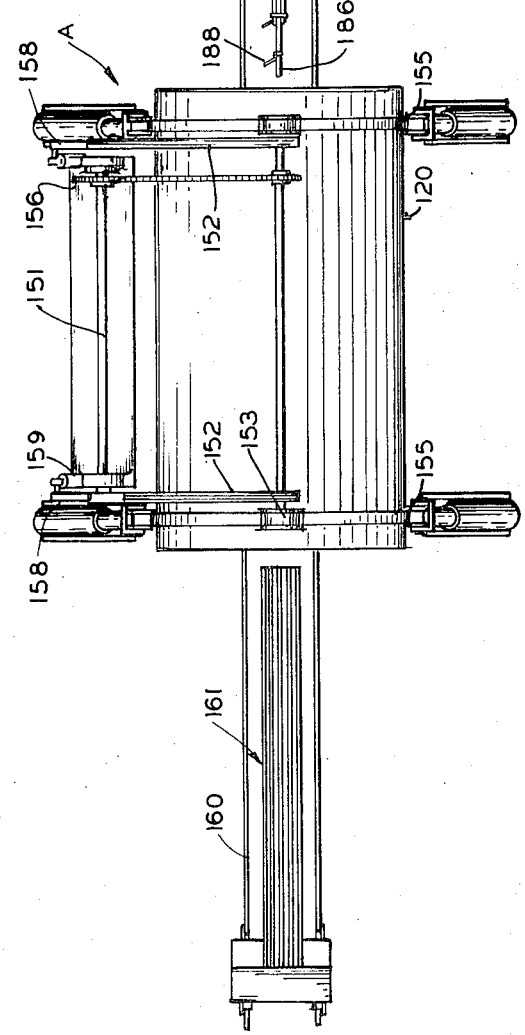
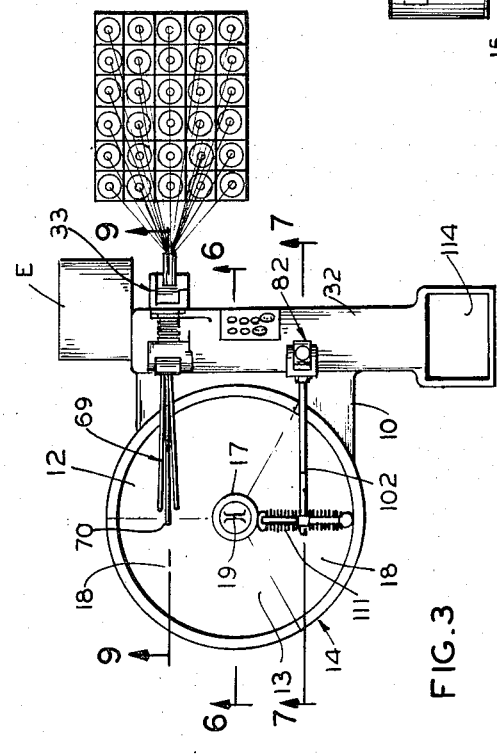
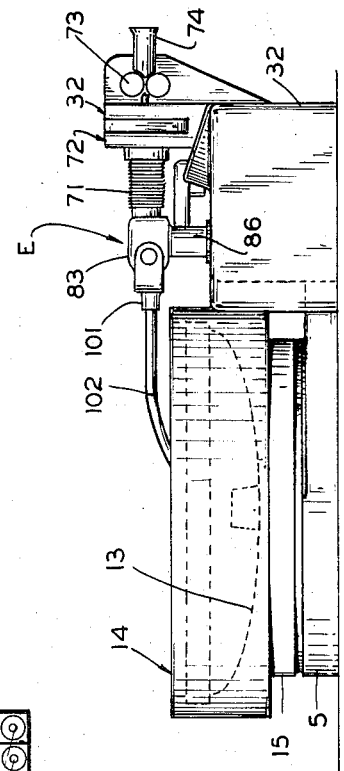

Sept. 19, 1972  W. B. GOLDSWORTHY ET AL  3,692,601
METHOD FOR MAKING A STORAGE TANK BY APPLYING CONTINUOUS
FILAMENTS TO THE INTERIOR SURFACE OF A ROTATING MOLD
Filed July 27, 1970  10 Sheets-Sheet 3

INVENTORS
WILLIAM B. GOLDSWORTHY
ETHRIDGE E. HARDESTY
BY
Robert J. Schaap
ATTORNEY

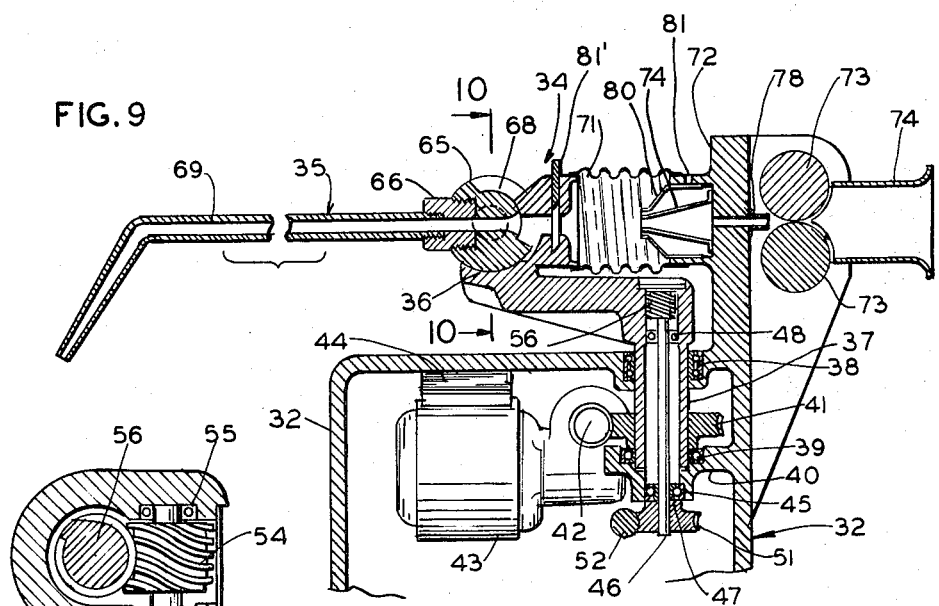
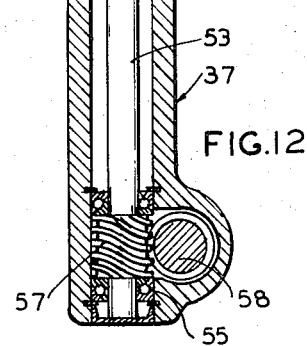
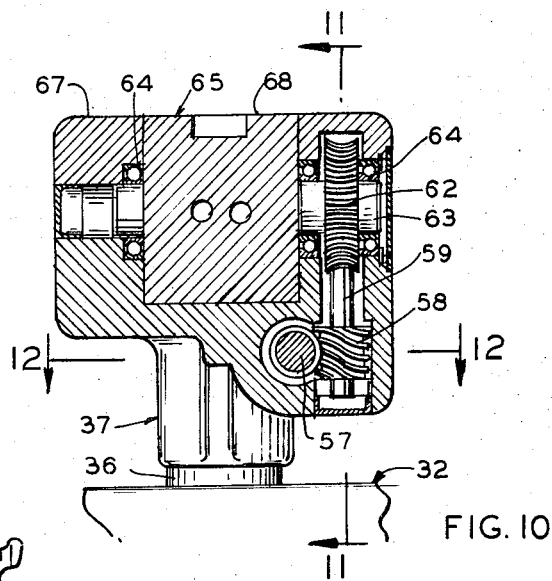
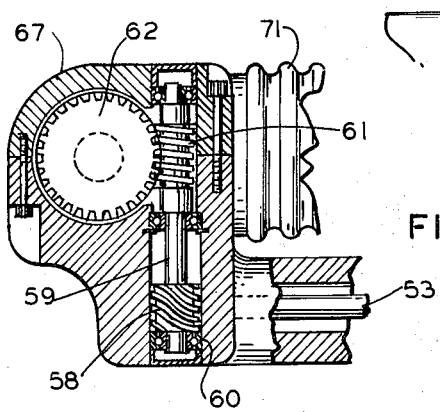

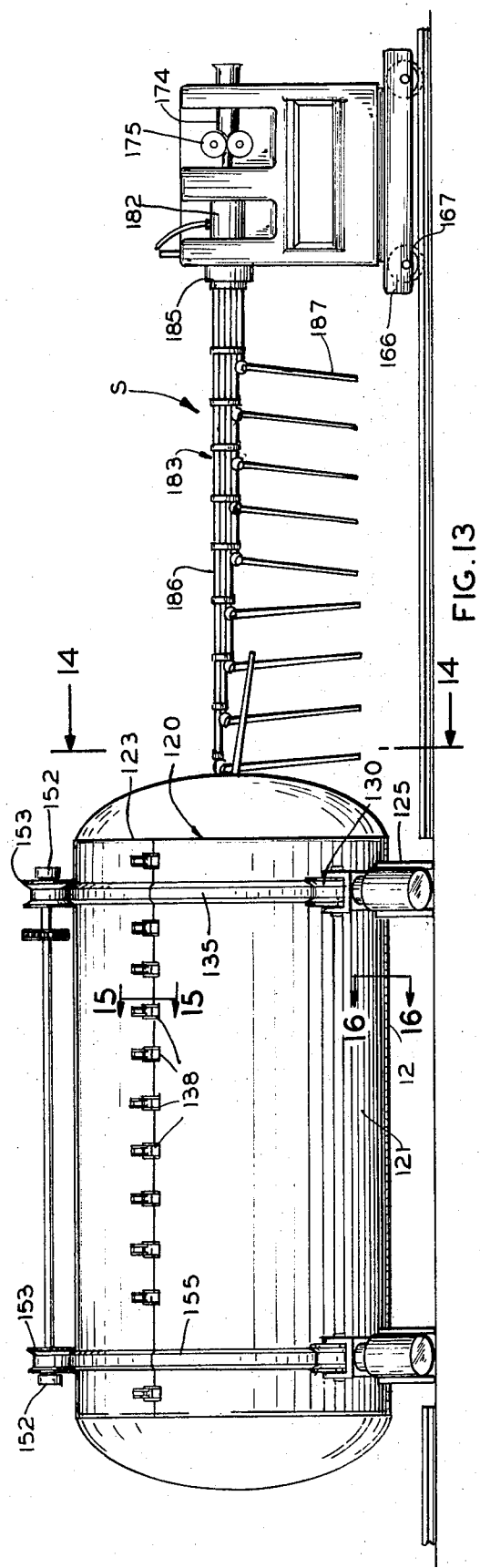

INVENTORS
WILLIAM B. GOLDSWORTHY
ETHRIDGE E. HARDESTY

BY Robert J Schanp
ATTORNEY

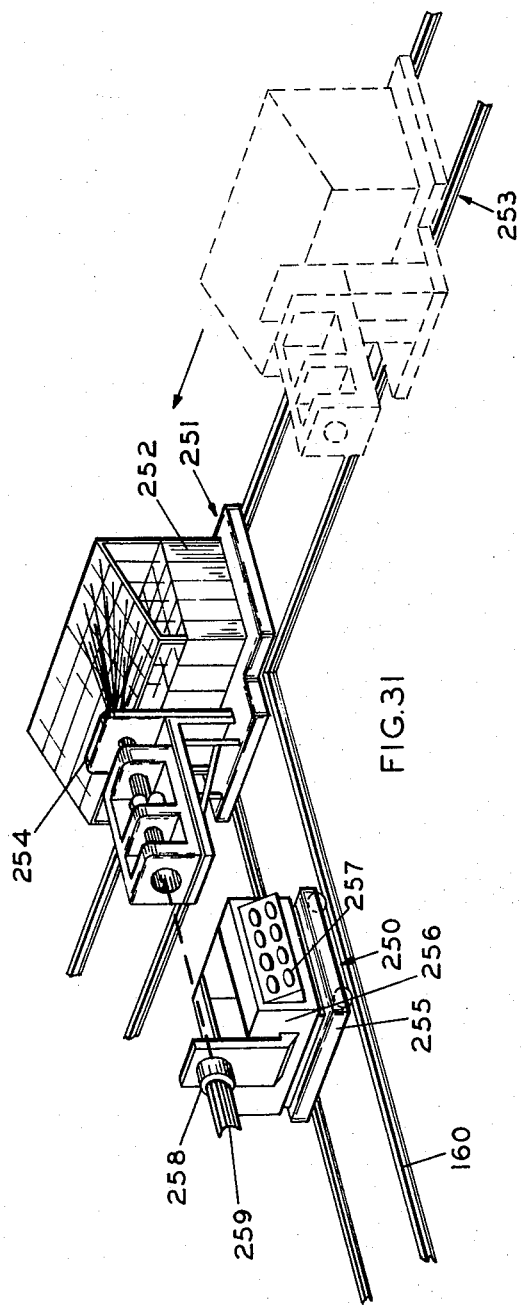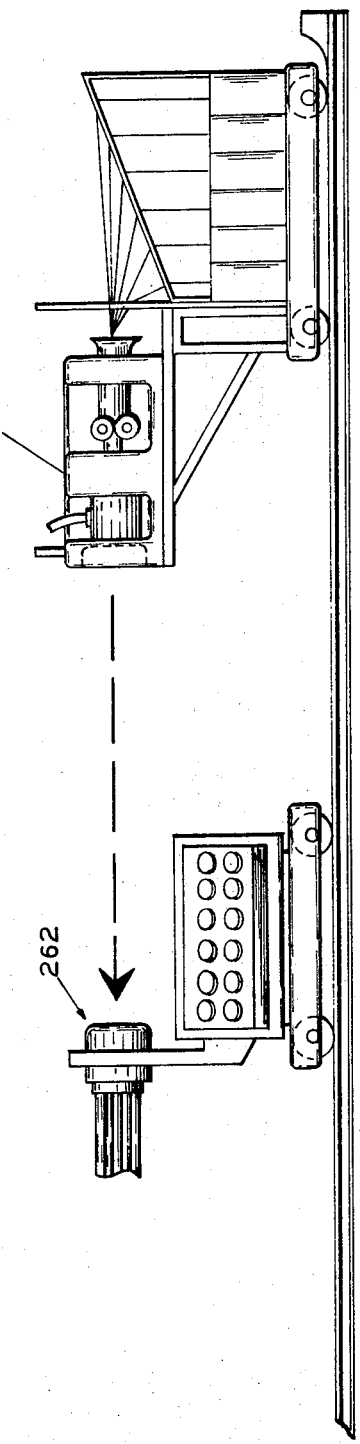

United States Patent Office 3,692,601
Patented Sept. 19, 1972

3,692,601
METHOD FOR MAKING A STORAGE TANK BY APPLYING CONTINUOUS FILAMENTS TO THE INTERIOR SURFACE OF A ROTATING MOLD
William B. Goldsworth, Palos Verdes Estates, and Ethridge E. Hardesty, Pine Valley, Calif., assignors to Goldworthy Engineering, Inc.
Filed July 27, 1970, Ser. No. 58,482
Int. Cl. B32b 31/16; B65h 81/00
U.S. Cl. 156—74
7 Claims

ABSTRACT OF THE DISCLOSURE

A fiberglass reinforced storage tank formed by constructing a filament reinforced cylindrical side wall and enclosing the transverse ends with a pair of end domes. The end domes are prefabricated in a circular mold of proper contour and size. A solvent dispersed mold release agent is sprayed into the mold over the entire mold surface. Glass filaments are then laid along with a spray of catalyzed binder resin in the rotating heated mold, beginning at the center and extending to the outer periphery thereof to form the resin cured rigid end domes. The annular cylindrical side wall is formed by applying fiberglass resin to the interior surface of a rotating cylindrical mold in the presence of a catalyzed binder resin with the formed end domes secured to the transverse ends of the mold during side wall formation. A particulate matter such as sand may be added to the composition. The mold is divided into longitudinal arcuate sections which are capable of separating for removal of a finally formed storage tank.

DISCLOSURE

This invention relates in general to certain new and useful improvements in apparatus and process for making fiberglass reinforced storage tanks. More particularly, the invention relates to an improved method of making fiberglass reinforced storage tanks by initially forming a pair of tank end domes. A cylindrical side wall of the tank is centrifugally cast making the prefabricated end domes for the tank an integral inclusion in the annular side wall.

It has long been a common practice to construct underground storage tanks for the containment of liquid fuels such as gasoline, fuel oil, etc. from sheet steel or other heavy metals. It has also been a common practice to coat all exterior surfaces of such tanks with a corrosion preventive film such as bitumastic, filled resins, etc. However, these external coatings when applied to the tanks have not been entirely successful in preventing the encroachment of metal corroding fluids. In addition, the majority of these tanks are not coated on the inner surface which very often leads to corrosion from the interior surface.

In order to obviate the problems encountered with metal tanks, many industries such as the petroleum industry have attempted to employ glass reinforced plastic tanks which are resistant to corrosive soil conditions or normally corrosive liquid contents. In addition, reinforced plastic tanks are not subjected to the possible incidental damage from stray electric currents resulting in galvanic attack as is oftentimes the case in steel tanks. In view of the evident advantages of glass reinforced tanks for underground service, many industries have sought suppliers for these tanks. Typically, the presently available reinforced plastic tanks are constructed by standard filament winding techniques to accumulate the cylindrical side wall and the end dome structure. These filament winding techniques are more fully described in U.S. Letters Patent No. 2,731,376. Filament winding techniques are often quite expensive and require a substantial amount of time in order to complete the fabricating of the structure.

Another technique of forming the tank side wall resides in the application of glass mat or a combination of filament strands and chopped glass along with glass mat which are directly applied to the surface of a mandrel. However, conventional glass mats and chopped glass do not provide sufficient hoop strength and more importantly do not provide for adequate buckling resistance against external loading.

There have been other attempts to cylindrically cast the tank side wall by applying strands, glass mats, or chopped glass, or a combination of these elements to the interior surface of a mold. The glass reinforced material is then resin impregnated and cured in order to form the cylindrical structure. However, in underground tanks where the primary loading is a compressive buckling, (as opposed to hoop tension in the case of the above ground tanks), it is desirable to produce a relatively inexpensive but fairly thick tank wall. The extant techniques result in tanks with high strength hoop tension. Accordingly, the conventional hand lay-up and spraying techniques have severe shortcomings in the fabrication of underground tanks and similar structures.

The present invention is, therefore, designed to provide an apparatus and method for producing a thick wall tank section with inexpensive raw materials that are combined in such manner to provide adequate compressive buckling resistance as well as economic feasibility.

OBJECTS

It is, therefore, the primary object of the present invention to provide a method and apparatus for the production of filament reinforced storage tanks adaptable for use in underground systems.

It is another object of the present invention to provide a method and apparatus of the type stated for the manufacturing of fiber reinforced storage tanks by separately forming various components forming part of the storage tank and finally assembling these components into a unitary structure.

It is an additional object of the present invention to provide an apparatus for producing fiber reinforced storage tanks on a mass-production basis which eliminates the necessity of employing conventional filament winding techniques and manually directed spray-up.

It is another salient object of the present invention to provide an apparatus and method of the type stated which is readily adaptable to produce storage tanks of a wide variety of sizes and shapes.

It is a further object of the present invention to provide a method of producing filament reinforced fiberglass storage tanks which enables formation of a tank with all of the necessary physical capabilities and mechanical attributes normally found in filament wound tanks, but which eliminates the undesirable conventional filament winding techniques.

It is also an object of the present invention to provide both a method and apparatus of producing filament reinforced fiberglass storage tanks where particulate matter such as sand may be incorporated into the composite for enhancing the structural properties and the overall appearance of the final tank.

With the above and other objects in view, our invention resides in the novel features of form, construction, arrangement, and combination of parts presently described and pointed out in the claims.

FIGURES

In the accompanying drawings (10 sheets):

FIG. 3 is a top plan view of the apparatus of FIG. 1 for constructing the end domes forming part of the filament reinforced tank, and which is constructed in accordance with and embodies the present invention;

FIG. 4 is a side elevational view of the apparatus of FIG. 3 for constructing the end domes;

FIG. 5 is a top plan view of the apparatus of FIG. 2 for making the side wall of a filament reinforced storage tank, and which is constructed in accordance with and embodies the present invention;

Figures 6, 7, 8:
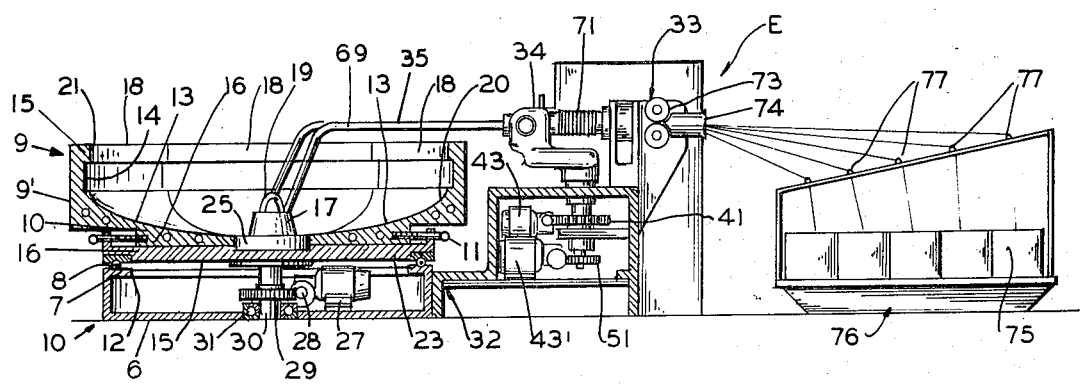

FIGS. 6 and 7 are vertical sectional views taken along lines 6—6 and 7—7 respectively of FIG. 3;

FIG. 8 is a fragmentary sectional view taken along line 8—8 of FIG. 7.

Figure 2:
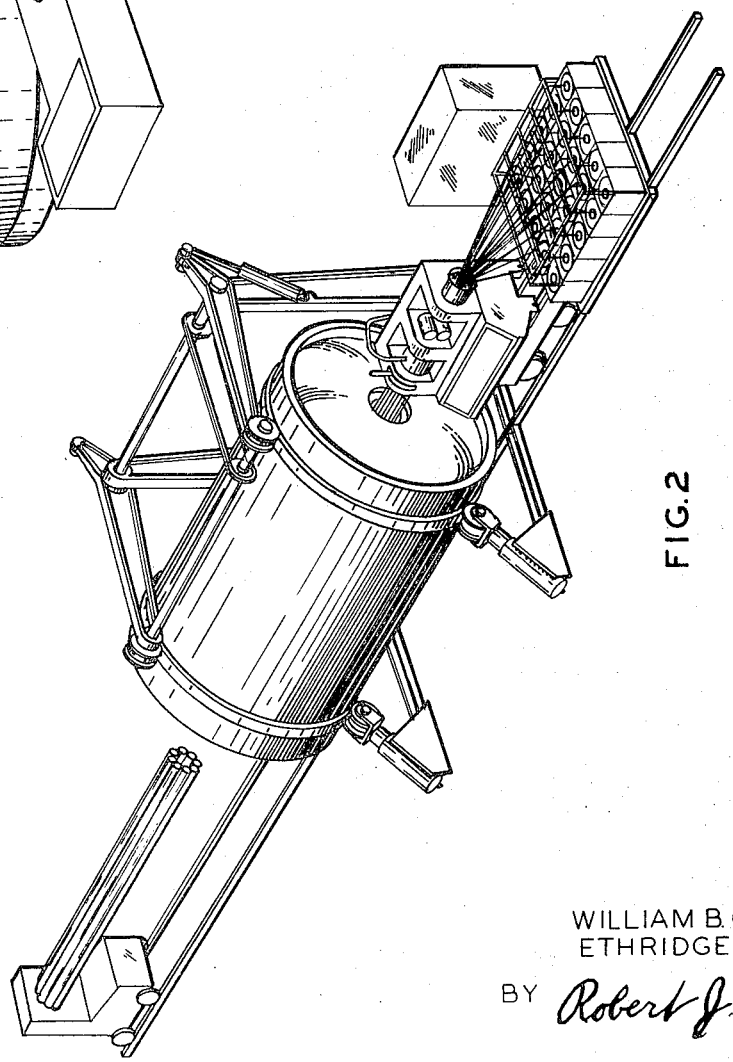
FIG. 2 is a perspective view showing the apparatus for forming the annular cylindrical side wall of the storage tanks of the present invention with the end domes as an inclusion thereof.
Figure 19:
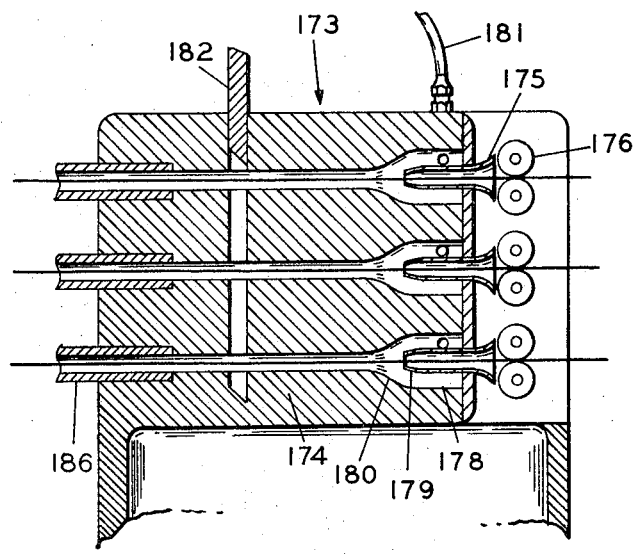
Figure 17:
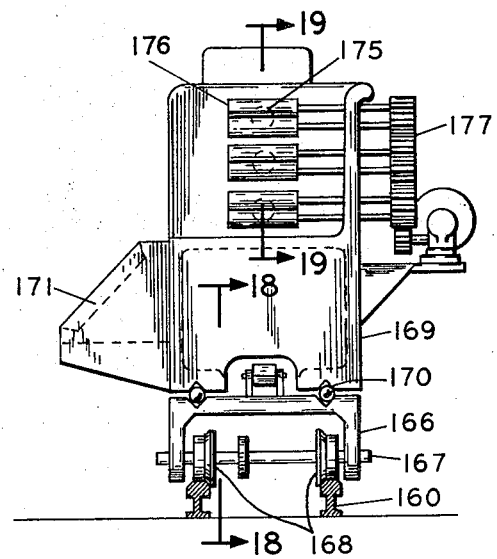
Figure 18:
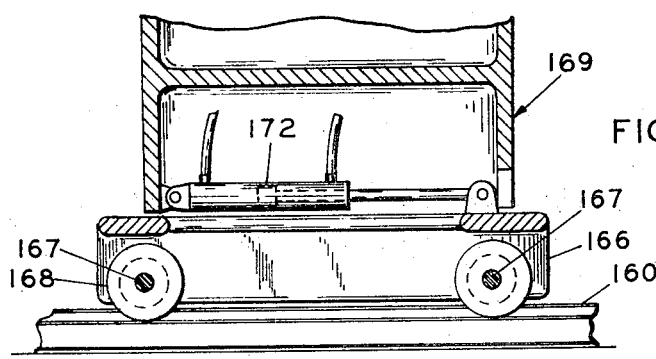
Figure 20:
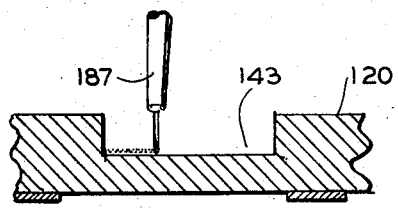
Figure 22:
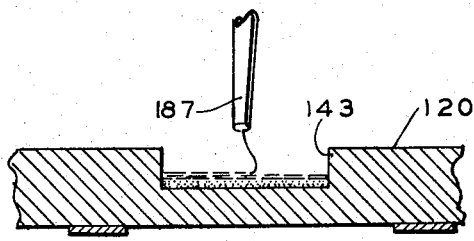
Figure 21:
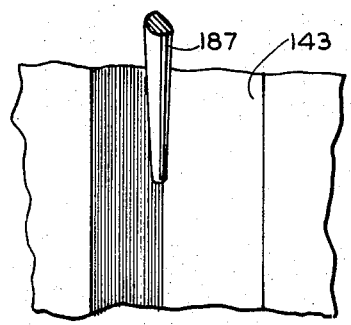
Figure 23:
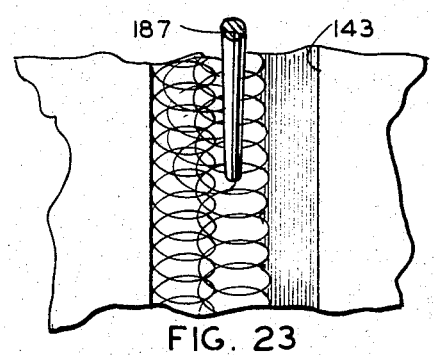
Figure 24:
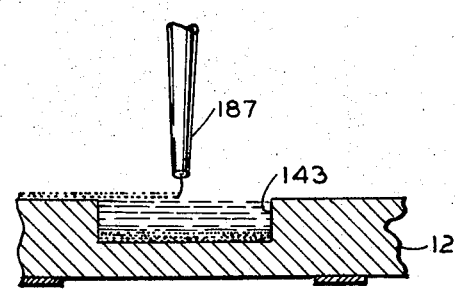
Figure 26:
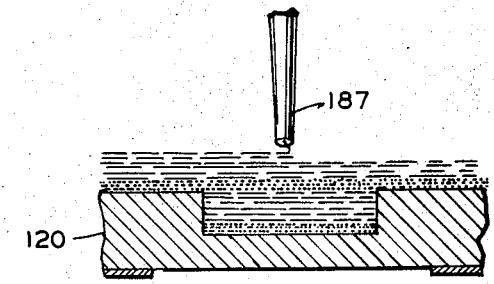
Figure 25:
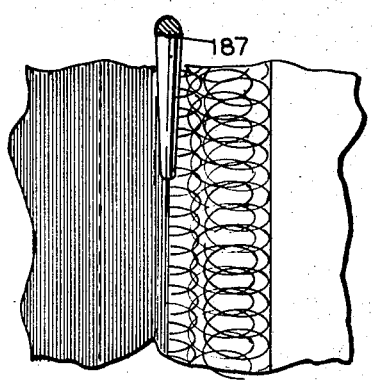
Figure 27:
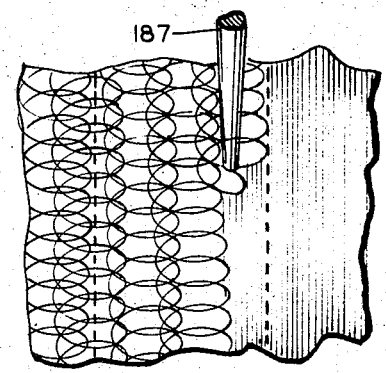

FIG. 9 is a vertical fragmentary sectional view taken along line 9—9 of FIG. 3;

FIG. 10 is a vertical fragmentary sectional view taken along line 10—10 of FIG. 9;

FIG. 11 is a vertical fragmentary sectional view taken along line 11—11 of FIG. 10;

FIG. 12 is a horizontal fragmentary sectional view taken along line 12—12 of FIG. 10;

FIG. 13 is a front elevational view of a portion of the apparatus of FIGS. 2 and 5 for forming the side wall of the tank;

FIG. 14 is a vertical sectional view taken along line 14—14 of FIG. 13;

FIGS. 15 and 16 are fragmentary sectional views taken along lines 15—15 and 16—16, respectively, of FIG. 13;

FIG. 17 is an end elevational view showing the carriage forming part of the apparatus of FIG. 13;

FIG. 18 is a vertical fragmentary sectional view taken along line 18—18 of FIG. 17;

FIG. 19 is a vertical fragmentary sectional view taken along line 19—19 of FIG. 17 and showing the lance supporting frame forming part of the present invention;

FIGS. 20–27 are a series of sequential schematic sectional views showing the application of strands to a mold to form the side wall shell of a tank, of which;

FIG. 20 is a schematic side elevational view showing the initial laying of circumferential filament strands in a groove forming part of the mold of the present invention;

FIG. 21 is a top plan view showing the laying of circumferential filament strands in the grooves forming part of the mold of the present invention;

FIG. 22 is a schematic end elevational view showing the laying of a second layer of fiberglass strands in the form of spirals;

FIG. 23 is a schematic top plan view showing the application of the second layer of strands in the form of spirals in the fabrication of the side wall shell;

FIG. 24 is a schematic side elevational view showing the application of the third layer of strands in the form of circumferential elements in the fabrication of the side wall shell;

FIG. 25 is a top plan view showing the application of the third layer in the form of circumferential strands;

FIG. 26 is a schematic side elevational view showing the laying of filament strands in the form of spirals to constitute the fourth layer;

FIG. 27 is a schematic top plan view showing the laying of the filament strands in the form of spirals to constitute the fourth layer.

Figure 28A:
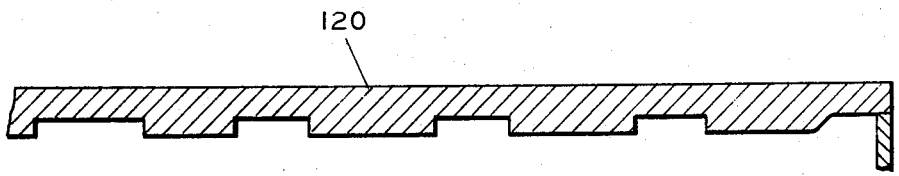
Figure 28B:
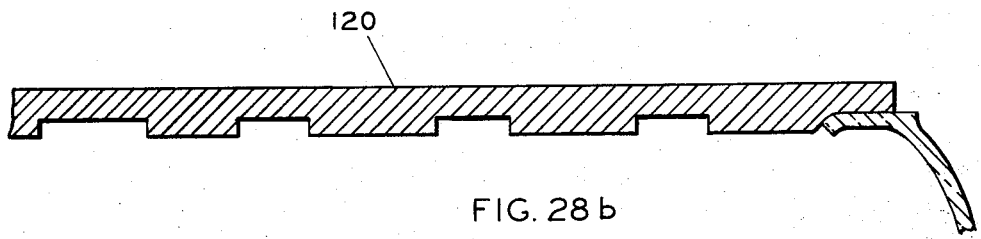
Figure 28C:
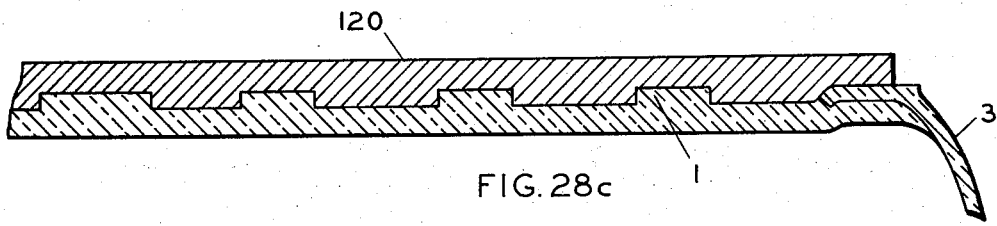

FIG. 28 comprises three schematic sectional views showing the various stages in securing the end domes to the tank side wall of which:

FIG. 28a is a fragmentary vertical sectional view showing a portion of the mold used to form the tank side wall;

FIG. 28b is a fragmentary vertical sectional view showing a portion of the side wall formed in the mold; and FIG. 28c discloses the technique of incorporating a flange on the end dome integrally into the tank side wall.

Figure 29:
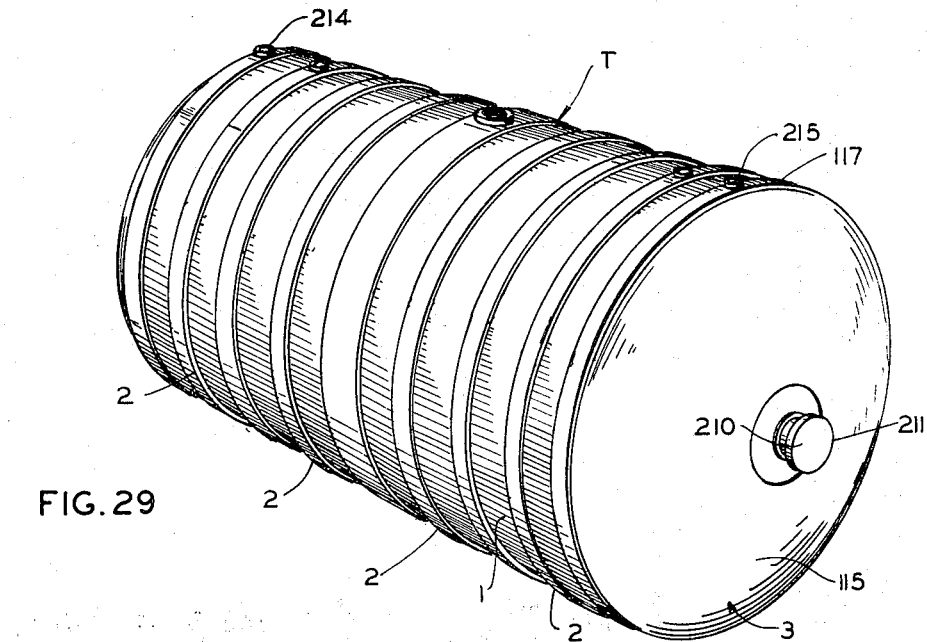
Figure 30:
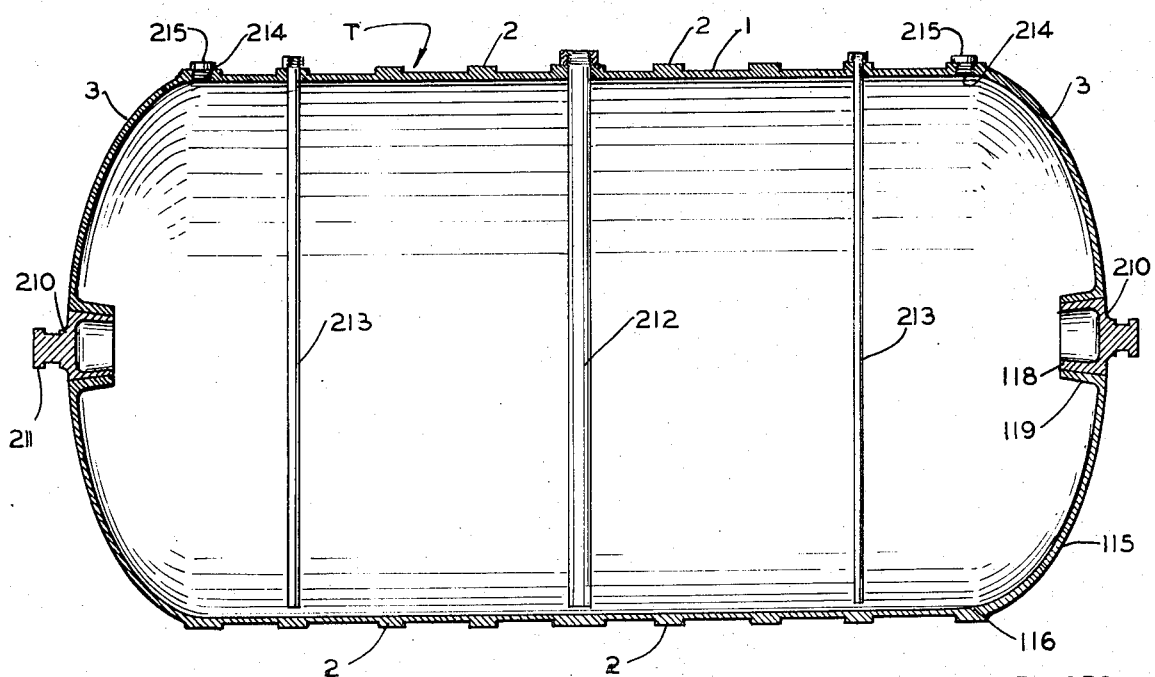

FIG. 29 is a perspective view showing the finished tank forming part of the present invention;

FIG. 30 is a vertical sectional view showing the interior of the finished tank of FIG. 28;

FIG. 31 is a perspective view of a modified form of apparatus for forming the storage tank side wall of the present invention; and FIG. 32 is a side elevational view of the apparatus of FIG. 30.

GENERAL DESCRIPTION

The present invention provides a unique method for constructing underground storage tanks on a rapid and economical basis. This method is described hereinafter in detail. A particular embodiment of an apparatus suitable for accomplishing the method of the present invention is also illustrated and described herein. The storage tanks of the present invention are constructed by separately forming an annular cylindrical tank shell or so-called "annular side wall" in a three-piece mold. The end domes, which are ultimately secured to the annular side wall are also formed in a separate female mold.

The end domes are prefabricated in a circular metal female mold which is positioned horizontaly and has a concave major surface, contoured to form the dome portion. The mold is also provided with an integral circular ring extending upwardly from the concave major surface. The mold is heated and a thin film of solvent dispersed mold release is sprayed upon the concave surface thereof. Thereafter a resin gel coating may be optionally sprayed over the entire mold surface. The gel coating, if employed, should be pigmented with an inert cololid. After the gel has been allowed to stiffen slightly, fiberglass filaments are layed on the entire surface in a spray of catalyzed binder resin. The mold is rotated about its axis of rotation and the speed of rotation is automatically programmed to coincide with the rate and pattern at which the glass filaments are applied. As the fiberglass deposition path increases radially outward from the axis of rotation of the mold, the speed of the mold is proportionally reduced. The circular upstanding peripheral flange only carries a sufficient amount of binder-resin to hold the filaments in place to create a slighlty rigid self-supporting flange. The end dome will have a raised center embossment forming a small hole in the end dome which is locally reinforced about its periphery and root. This hole formed in the end dome allows access for subsequent processing.

The annular side wall of the storage tank is formed in a three-piece external cylindrical mold. In essence, the mold is divided into three curved longitudinal plates arranged 120° apart. One of the curved plates is hinged along both edges to each of the other two plates. These plates are, in turn, fastened together along the remaining respective edges by a full length quick release cam lock mechanism. The interior surface of the mold is highly polished and contains a plurality of circumferential grooves longitudinally spaced along the length of the cylinder. The grooves are approximately 6" wide by 2" deep and form the tanks reinforcing ribs, or so-called "external hoops." These ribs assure adequate buckling resistance in the finished tank wall structure. In addition, the ends of the cylindrical mold are recessed to receive the circumferential rim flanges of both of the end domes which are separately prefabricated. External restraining lugs are also provided to hold the end domes securely and accurately in position. The cylinrical metal mold is also warmed and is rotated about its major axis. The cylindrical support and transfer of rotating force is accomplished by conventional drive rollers and idlers.

A lance ararngement comprising several tubes is inserted into the tank interior along its major axis. The lance carries a plurality of axially spaced radially directed tubes for transporting the glass filament rovings. Additional tubes are carried by the lances to deliver the liquid binder-resin. It is also possible to have the lance carry high intensity lights for allowing an operator to view the process and monitor the operations. When the prefabricated end domes are locked into position, and the lance is inserted for its full length into the tank mold interior the mold is rotated initially at a relatively slow speed. A solvent dispersed mold release agent is sprayed by the leading tube on the inner metal surface as the lance is being inserted into the cylindrical metal mold. Following this, an exterior gel coat is applied and allowed to stiffen. These materials are substantially the same as those employed in the end dome fabrication.

After the application of the mold release agent and the binder-resin, the speed of rotation of the cylindrical mold is increased. All but two of the filament nozzles lay circumferential rovings into the grooves longitudinally spaced along the length of the mold. It is also possible to add a particulate matter to the resin-glass composition during the formation of the side wall of the tank, as well as in the end dome fabrication. A separate nozzle carried by the lance would be capable of applying the proper amount of metered sand or other particulate matter during the formation of the component. The amount of sand added is regulated in accordance with the structural properties desired in the final product as well as the surface appearance to be achieved. In addition, the particulate matter filler is a relatively inexpensive component and the amount used would be dependent upon the overall economies which are desired in the fabrication of the components.

This coverage is obtained by reciprocating the lance back and forth horizontally. Furthermore, this filament application is continued until an initial high-density structural layer in the form of a flat ring is obtained in each hoop. Thereafter, the speed of rotation of the mold is reduced or the glass feed rate is increased and glass filaments are caused to lay down in the form of overlapping continuous flat spirals until the groove is filled. Flat bands of filament spirals are also applied by the two remaining filament nozzles to the peripheral flanges of the end dome. Thereafter, the rotational velocity of the mold is again increased to its original velocity to lay down complete and continuous layers of circumferential windings or so-called "circumferentials" over the entire inner mold surface. The lance reciprocates during the rotation of the mold. Simultaneously with the laying of the continuous filaments, a light spray of liquid, catalyzed binder resin has also been applied. Particulate matter may also be added during this time as well.

After the application of the surface shell of circumferential strands, the mold is again slowed and a flat spiral core deposition is resumed in the manner as previously described. This spiral deposition is applied to the entire inner surface and also to the end dome flanges. This filament application is continued until the design shell-wall thickness has been achieved.

Thereafter, the mold speed of rotation is increased and additional liquid resin is applied in the form of a very thin resin float on the inner surface. The inherent centripetal force from the rotation of the mold aids in compacting the glass-resin composite. Furthermore, the end dome rims are now merged into an integral part of the whole tank structure with a resin-rich inner surface now extended to bond with that of the prefabricated end dome. This type of construction essentially forms a unitized one-piece structure with an unbroken shell structure and inner "skin."

After allowing sufficient time for the resin to cure, the mold is stopped and the end dome restraining lugs are relieved. The mold is unlocked and swung open and the finished tank is lifted out. Thereafter, subsequent finishing operations and hardware attaching operations may be employed.

The present invention includes a number of unique aspects in the fabrication of storage tanks and similar structures. One of the unique aspects resides in the centrifugal application to the interior surface of a rotating mold of a combination of glass strands and resin in predetermined properly metered quantities to form a structural shape. Furthermore, the invention includes the application of glass strands in combination with a curable resin and a particulate matter such as sand or the like, to the interior surface of a rotating mold in such quantities as to produce a tank structure with sufficient wall thickness to resist compressive buckling loads in a relatively inexpensive manner. The quantities of these materials are all properly metered and deposited on the interior surface of the mold in properly timed relationship to form the predetermined desired structure.

A further unique aspect of the present invention resides in a mechanism for employing a lance capable of depositing the resin, the particulate matter and the glass strands to the interior surface of the mold where the rate of reciprocative movement of the lance is properly programmed to the speed of rotation of the mold in such manner that glass strands can be applied to the interior surface of the mold in a circumferential pattern, such as occurs in filament winding on an external surface, or in helically formed strands, or in a swirl pattern.

In addition to the foregoing, the present invention also provides an apparatus which includes a number of unique aspects for accomplishing the various operations necessary in the fabrication of both the end domes and the tank side wall.

In addition to the foregoing, the present invention provides a unique method of bonding the end dome to the tank side wall by providing an end dome with a resin-starved peripheral flange which is capable of being wound into the tank side wall during the formation of the tank side wall so that the end dome actually becomes an integral inclusion in the formation of the tank side wall.

METHOD

Figure 1:
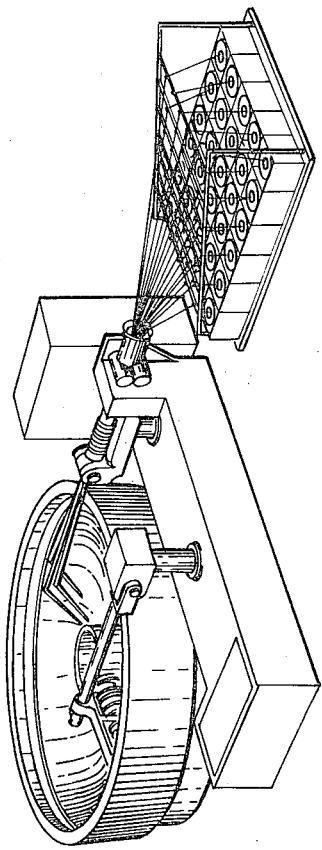
FIG. 1 is a perspective view showing the apparatus for preforming cylindrical end domes which form part of the storage tanks of the present invention.

The entire tank is constructed by preforming each of the end walls or so-called "end domes" in the apparatus illustrated in FIG. 1. In essence, a pair of end domes are formed and these end domes are connected to and structurally intergrated into a tank side wall hereinafter described. In the formation of the end domes, a resin matrix is laid in the mold surface and the fiber reinforced material is thereafter deposited on the resin layer. Generally, the mold is rotated at a speed which is programmed to the filament deposition rate. In one embodiment of the invention, it is possible to rotate the mold and employ a series of feeding heads which extend for the radius of the mold, thereby applying a continuous layer of filament to the mold surface as it rotates. As another embodiment, it is possible to reciprocate the filament feeding tube for a distance equal to the radius of the mold as the mold rotates. Furthermore, it is also possible to rotate the filament feeding tube about the mold in circles of increasing radii in order to lay continuous filament strands on the entire surface of the mold.

The mold is also heated in order to obtain faster solidification of the binder resin and shorter cure time in the completed lay-up. If desired, a solvent-dispersed mold release may be sprayed upon the surface of the mold prior to the time that the resin matrix and filaments are laid therein. The filaments are laid in such fashion that they cover the entire crown surface of the mold and extend up onto a center embossment in order to provide a locally reinforced center aperture. In addition, the mold has a side wall which is also designed to receive the filament strands. However, this latter portion of the mold will have a resin starved layer so that the portion of filament strands which form a peripheral flange on the end dome is rather dry and contains only enough resin to hold the filaments in place.

After the end domes have been formed, they can be conveniently removed from the mold. For this purpose, the mold may be a segmented mold divided into a plurality of arcuate sections which are designed to shift radially in order to enable the removal of the mold. Any conventional mechanism, however, for removing the final end dome from the mold may be employed.

The mechanism for producing the annular side wall of the tank and for integrally including the end domes in the formation of the annular side wall is more fully illustrated in FIG. 2. A number of sequences are performed during the actual tank formation. By reference to FIG. 2, it can be seen that the mold for producing the annular side wall is segmented and each of the sections is arcuately pivotal so that the side wall formed therein can be removed. It can be seen that a pallet containing a series of roving spools are shiftable with a feed carriage, the latter containing a lance which extends into the mold.

As an initial step in the formation of the tank structure, the previously prefabricated end domes are inserted into the transverse ends of the cylindrical mold. Thereafter, a lance which feeds both the filament from the pallet and which contains resin applicators is inserted through the aperture of the end dome into the cylindrical mold.

After the lance arrangement which carries the filament and resin matrix has been inserted into the mold, the resin applicators are actuated to lay a thin resin layer on the surface of the mold while the mold is rotating. Furthermore, the mold is rotating at a relatively slow speed which is only sufficient to cause the centrifugal force to hold the resin against the side wall. Thereafter, the filament feeding nozzles which are mounted on the lance are advanced to a point where they are close to grooved surfaces on the interior of the mold.

The mold is provided with a series of longitudinally spaced circumferential grooves which are designed to form external hoops in the final tank side wall. After the filament feed nozzles have been advanced close to the surface of the grooves, a layer of filament is laid into each of the grooves at a rate identical to the peripheral speed of the surface through the rotation of the mold. At this point, the lance is advanced causing the fibers to lay side-by-side within the confines of each of the grooves. It should be recognized that an individual feeding nozzle is provided for each groove. In order to provide a fiber thickness of several layers, the lance may be shifted so that the feed nozzles are shifted several times between the limits of the grooves.

After each of the mold grooves have been filled with the filament applied in a side-by-side pattern, much in the same manner as employed in conventional filament winding techniques, the rate of filament feeding to the feeding nozzles is changed. Metering rollers are provided for regulation of feed rate and are programmed to account for the change in peripheral speed of the deposition surface. As the filaments are applied to the groove, the build-up will reduce the overall radius of filament application and accordingly, the peripheral speed thereof will change. Inasmuch as the filament must be applied at the same rate as the peripheral speed of the deposition surface moving past the filament nozzles, the metering rollers are designed to account for this change in peripheral speed.

After the grooves have been completely filled, the amplitude of the lance reciprocation is increased to a distance which is slightly greater than the distance between the two grooves. Actually, each feeding nozzle will move from the midpoint of the area between one set of grooves to the midpoint of the area existing between the next adjacent set of grooves. The filament is laid down in flat strands which are adjacent to each other until the nominal wall thickness has been attained.

The speed of rotation of the mold and the speed of reciprocation of the lance is held constant and the glass feed rate is materially increased by an order of magnitude to cause the filaments to lay in a swirl or spiral pattern. Simultaneously with the laying of the enlarged quantity of filament in these patterns, a resin spray from the resin feeding heads is applied and the rate of application is commensurate with the amount of glass deposited in the mold. It should be recognized that as an alternative, the glass feed rate could be maintained constant and the speed of rotation of the mold could be reduced in order to increase the amount of glass laid in the mold per unit of time. This build-up of swirl pattern filaments is continued until the desired wall thickness is attained. Thereafter, the resin application is ceased and the speed of rotation of the mold is increased. By placing a maximum centrifugal force on the deposited materials, it is possible to densify the materials and "float out" the entrained air. In addition, this type of action will cause the resin to move to the inner surface since the resin has a lower density than the reinforcing material. This will also cause a resin-rich inner layer which, in turn, forms a rather unique seal which can be further enhanced by the addition of small thin glass flakes. The mold is continually rotated at this speed and the lance is removed.

As an alternative, particulate matter, such as sand, may be added during the formation of either the end domes or the tank side wall, or both. The amount of sand typically would range from approximately 10% by weight of the total composition to approximately 90% by weight of the total composition. The sand is added either simultaneously with the application of the resin or at intermittent time intervals with respect to the resin. Separate nozzles are provided on the lance for adding the sand. In addition, the sand would be metered in order to provide the proper amount.

A longitudinally shiftable heater is located on the opposite side of the cylindrical mold with respect to the lance structure. After removal of the lance, the heater can be inserted through the central aperture of the opposite end dome and into the mold causing the resin impregnated reinforced fiberglass to cure. It should be noted that the relatively resin-poor peripheral flange on each of the end domes has been integrally included in the winding process during the formation of the annular side wall. Furthermore, this flange becomes an integral part of the side wall during the impregnation of the resin and overwindings of filament strands, thereby causing a structurally rigid fluid-tight seal to exist between each of the end domes and the annular side wall. It should be recognized that the side wall could be discretely formed with the end domes adhesively or otherwise secured to the side wall after the latter has been cured.

By the unique methods described herein, it can be seen that it is possible to produce a relatively large tank for liquid storage by centrifugal casting of continuous filament strands. Furthermore, it is possible to build a relatively thick side wall in a relatively short period of time and to produce a resin-rich inner surface on the interior surface of the tank. In addition, the glass is transported by an air vehicle in the lance and this type of arrangement materially reduces the normal problem encountered in the transporting of fiberglass. The tank produced by the method and the apparatus of the present invention is rather unique in that it is capable of withstanding high compression loads. Normally, surface tanks are designed to have a high burst strength with high top loads. However, the underground tanks must also be able to withstand high compression loads. Accordingly, the conventional filament winding techniques are not applicable for producing the desired type of underground storage tank. The tank of the present invention is uniquely designed to produce a side wall with a high buckling modulus. The filament winding technique alone will provide a tank shell or side wall with a high degree of tensile strength and some compressive strength. By using the combination of filament placement and the type of resin and fiber reinforced deposition employed herein, it is also possible to obtain the high buckling modulus.

In order to accomplish the method of the present invention, a preferred embodiment of the apparatus for producing the storage tank described herein is more fully illustrated and described. It should be recognized that there are a number of components which can be substituted for the components herein described in this particular embodiment of the apparatus. For example, pneumatic drive systems could be conveniently substituted for the gear drive systems illustrated and described herein. Nevertheless, the particular embodiments of the apparatus herein described and illustrated have been found to be the most preferred embodiments.

DETAILED DESCRIPTION (APPARATUS)

Apparatus for producing storage tank end domes

Referring now in more detail and by reference characters to the drawings which illustrate a preferred embodiment of the present invention, A designates a system of apparatus for producing filament reinforced storage tanks T. The tank T generally includes an annular side wall 1 having a series of longitudinally spaced circumferential ribs or so-called "hoops" 2. Furthermore, the tank T includes a pair of end domes 3, at each of the transverse ends. Each of the end domes 3 is substantially identical in construction.

Referring now to FIGS. 4 and 6, E represents an end dome forming apparatus forming part of the system A and having a circular base housing 5. The base housing 5 is provided with a bottom wall 6 and an inwardly struck annular support flange 7 at its upper end. Rotatably mounted on the flange 7 by means of ball bearings 8 is a circular female mold 9 which is horizontally disposed and which is secured to a lower support housing 9' in the manner as illustrated in FIG. 6. The circular mold 9 has a downwardly extending boss 10, which is engageable on the base housing 5 and is adjustably positioned thereon by means of a plurality of circumferentially spaced bolts 11.

The mold 9 is a segmented member and consists of a series of endwise abutting arcuate sections 12 which are arranged in a circular pattern in the manner is illustrated in FIGS. 3, 4, and 6. Furthermore, the various arcuate sections 12 are radially shiftable for a short distance in order to remove an end dome structure 3 which is formed with the mold 9, in a manner to be hereinafter described in more detail.

The mold 9 generally includes a concave major surface 13 which integrally merges into a recessed side wall 14 in the manner as illustrated in FIG. 6. Additionally, the side wall 14 merges into an extended relatively short annular flange 15. The casing of each of the arcuate sections 12 forming the mold 9 carries conventional heating elements which are connected to a suitable source of electrical power (not shown) for energizing the heating elements.

The support housing 9' includes a horizontal plate 16, which is somewhat centrally recessed on its upper surface for accommodating a removable upstanding plug 17 is also provided with an upstanding eyelet 19 for engagement by a conventional hook for removal of the plug 17.

Mounted in the base housing 5 is a conventional electric motor 27 for driving a worm 28 through a conventional gear reduction mechanism. The worm 28 is disposed in meshing engagement with a worm gear 29, the latter being mounted upon a rotatable worm shaft 30. The worm shaft 30 is journaled in conventional ball bearings 31 mounted in the base housing 5 and is also secured to the underside of the support housing 9' for rotating the mold 9. In addition, the electric motor 27 is also connected to the source of electrical power for energizing the same.

Secured to the base housing 5 is a power housing 32 which is more fully illustrated in FIGS. 6 and 7. Mounted on the upper surface of the housing 32 is a filament dispensing mechanism 33 which comprises a movable head 34 carrying a lance 35. The head 34 includes an outer casing 36 having a downwardly extending integrally formed sleeve 37 which serves as a quill shaft. The sleeve 37 is journaled in upper bearings 38 formed in the top wall of the housing 32 in the manner as illustrated in FIG. 9. The lower end of the sleeve 37 is journaled in ball bearings 39 retained by an inwardly extending flange 40 in the manner as illustrated in FIG. 9. Carried by the quill shaft 37 and being rotatable therewith is a worm gear 41 which meshes with a conventional worm 42, the latter being powered by a conventional electric motor 43. The motor 43 is secured to the underside of the top wall of the housing 32 by means of a bracket 44. In addition, the motor 43 may be provided with conventional speed reducers as desired.

The inwardly struck flange 40 is provided with a downwardly extending hub 45 for journaling a central drive shaft 46 in a ball bearing 47. The drive shaft 46 is concentrically disposed within the quill shaft 37 and is journaled at its upper end by means of ball bearings 48. The central drive shaft 46 extends downwardly beneath the quill shaft 37 and carries a worm gear 51 which, in turn, meshes with a worm 52, the latter also being driven by the motor 43. It should also be understood that the worm 52 may be conventionally driven by any other power source. Thus, it can be seen that the central drive shaft 46 can be rotated independently of, or in timed relation to the rotation of the quill shaft 37.

Extending horizontally through the head 34 is an idler shaft 53 which carries a helical gear 54 at its rearward end. The shaft 53 is, in turn, journaled in bearings 55 carried by the head 34, as illustrated in FIG. 12. The helical gear 54, in turn, meshes with a helical gear 56 on the upper end of the central drive shaft 46 for rotation of the idler shaft 53. The forward end of the idler shaft 53 carries a helical gear 57 substantialy similar to the helical gear 54 and which, in turn, meshes with a cooperating helical gear 58, as more fully illustrated in FIGS. 11 and 12. The helical gear 58 is mounted on a stub shaft 59 which is journaled in bearings 60, also carried by the head 34. The upper end of the stub shaft 59 is provided with a worm gear 61 which meshes with a worm wheel 62, the latter being more fully illustrated in FIGS. 10 and 11. By further reference to FIG. 10, it can be seen that the worm wheel 62 is carried by a worm shaft 63 which is similarly mounted in bearings 64 carried in the head 34. By means of this construction, it can be seen that the drive shaft 46 will rotate the helical gear 56 and, in turn, rotate the idler shaft 53. This will, in turn, cause rotation of the stub shaft 59 through the action of the worm gear 61 and worm wheel 62. Rotation of the worm wheel 62 will cause the worm shaft 63 to rotate.

Also mounted on the worm shaft 63 and being rotatable therewith is a pivot block 65, which is located near the forward end of the casing 36 in the manner as illustrated in FIGS. 9 and 10. The pivot block 65 is provided with a forwardly extending sleeve 66 which carries the lance 35. It can be seen that the entire head 34 can be pivoted or rotated in a horizontal plane about the central axis of the quill shaft 37. In like manner, through the action of the pivot block 65 the lance 35 can be rotated or pivoted in a vertical plane about the central axis of the worm shaft 63. The pivot block 65 is actually constructed in the form of a type of spool valve and includes a drum 67 which is rotatable about a spool 68. The spool 68 is provided with circumferential grooving in order to provide a filament passageway.

The lance 35 includes a pair of filament feeding tubes 69 and a resin feeding tube 70, the latter extending forwardly of the filament feeding tubes 69. The rearward end of the drum 67 is secured to a flexible bellows 71 which is, in turn, secured to an upstanding bracket 72 in the manner as illustrated in FIG. 9. The bracket 72 carries a pair of vertically disposed metering rollers 73 which are located immediately forward of a tapered supply tube 74. The supply tube 74 receives glass filament from individual filament spools 75 mounted on a creel-frame 76. The strands of filament are threaded through eyelets 77 and pulled through the supply tube 74 and through the metering rollers 73. The filament strands are also pulled through a feeding aperture 78 and into the bellows 71. The strands are then threaded into the feeding tubes 69. A number of available rate controllers could be used to control the metering rollers and hence the rate of feed. For example, an infinitely variable speed electric motor with a programmed SCR control circuit could be employed.

By further reference to FIG. 9, it can be seen that a funnel-like guide tube 79 is formed in the bellows 71 and receives the strands and circumferentially disposed thereabout is a venturi tube 80. The venturi tube 80 is connected to a suitable source of air under pressure through an air pressure tube 81. Thus, it can be seen that filament in essence is sucked through the tapered guide tube 79, through air formed in the venturi tube 80 and is urged into the flexible bellows 71. Furthermore, the air under pressure carries the filament through the filament feeding tube 69. The resin supply tube 70 is connected to a suitable source of liquid resin (not shown). A conventional guillotine type cutter 81' is also mounted on the head 34 for periodically severing the filament strands.

The end domes which are formed in the mold 9 may be hemispherical in shape or the end domes may be generally designed to conform to the classic design of so-called "bumped end closures." The actual shape of the end dome is often predicated on the end use of the tank. The mold 9 is rotated through the action of the motor 27 about its axis of rotation and the speed thereof is automatically programmed to coincide with the rate at which the glass filament is applied to the crown surface thereof. As the glass filament is applied, the heating elements are energized for anticipating a faster solidification rate. Furthermore, better wetting of the glass filament is obtained through a temporary lower viscosity in the resin. In addition, a shorter cure time in the completed lay-up is also achieved. It is preferable to rotate the mold 9 and simultaneously oscillate the lance 35 so that the glass filament can be applied in a type of FIG. 8 pattern. It is also preferable to employ continuous rovings from standard 30–40 pound packages and at least 6 strands of 30- or 60-end rovings are laid onto the mold surface simultaneously. With at least six strands applied simultaneously, a ⅜" nominal wall thickness can be achieved in a relatively short period of time.

It can be seen the end dome mold has a raised center embossment through the plug 17 and so that when the lay-up is complete, an aperture locally reinforced about its periphery and root is produced in the center of the dome. This reinforcement is created since the glass filaments will be laid partially upon the lower margin of the plug 17. The end hole thus formed in the end dome is designed to provide access for subsequent processing which will be described hereinafter in more detail. It should be observed that the end dome could be formed with an inwardly struck annular flange such as by the mold illustrated in FIG. 4. This flange forms a lip which engages the transverse margin of the tank side wall when the end dome is disposed against the tank side wall. However by forming an end dome with no inwardly struck peripheral flange of the type described (as illustrated in FIG. 28), a nonsegmented mold could be employed. Furthermore, it has been found to be very desirable to form either a parabolic or hemispherical shaped end dome. By using a parabolically or hemispherically shaped end dome mold and properly programmed speed to the rate of resin application and mold size, the resin will become evenly distributed over the mold major surface.

Any continuous material or synthetic filament capable of being bent to conform to a desired shape can be employed in the present invention. The most preferred filament employed in the present invention is that made of glass. However, it should be recognized that boron filaments, graphite tows, filaments from lithium and other grown-whisker crystals can be employed. In addition, metal wire may be interspersed with the glass filaments in the event that it is desired to add some type of metallic body to the fiberglass reinforced structure which is produced, such as for electrical conductivity. Furthermore, quartz filaments may also be employed.

Any material which is normally liquefied or which is capable at some stage of the process of being liquefied and softened for a period of time may be employed as the resin binder or so-called "matrix." The matrix should be sufficient to flow around the filaments and fill the interstices between adjacent filaments and layers thereof before achieving a rigid state or completing polymerization to become a rigid solid. Furthermore, the matrix should possess the ability to adhere to the reinforcement. Some examples of the suitable binders or matrix which can be employed in the present invention are vairous thermoplastic resins, such as nylon, polyethylene, polypropylene, many of the polycarbonates, etc. In addition, thermosetting resins such as polyesters, many of the phenolics and epoxys, etc. can be used. Generally, the thermosetting resins should be capable of being fused into an insoluble, nonheat softening mass upon application of heat or similar method of triggering the catalytic system. Other binders or matrices are hard waxes, eutectic ceramics, eutectic metals, synthetic rubbers, etc.

Also mounted on the power housing 32 is an air removal and glass compacting roller mechanism 82 which generally comprises a swingable head 83 having an outer casing 84. Pivotally secured to the underside of the casing 84 is a support rod 85 which is mounted on the housing 32. The rod 85 pivotally supports the head 83 in the manner illustrated in FIG. 7. The head could be mechanically actuated if desired by a suitable gearing system and prime mover. Extending outwardly of the casing 84 through a slot formed therein is a retaining hub 101 which carries an outwardly extending arm 102. It is possible to shift the arm 102 in a vertical plane, and through the pivotal connection, it is possible to swing the same arm 102 in a horizontal plane. In addition, through a suitable drive mechanism and programming mechanism (not shown) these two motions can be performed simultaneously.

Mounted on the outer end of the arm 102 is a depending bracket 103, which is adjustably positioned on the arm 102 by means of a bolt 104. Mounted on the lower end of the arm 102 is a horizontally disposed roller 105 which is retained thereon by means of a laterally extending link (not shown). The roller 105 is provided with a riged annular surface in the manner as illustrated in FIG. 7. Also mounted on the bracket 103 is a laterally extending link 106 which rotatably supports a roller 107. The link 106 and roller 107 is more fully illustrated in FIG. 8 and the link 106 comprises a rack bar 108 having a series of laterally struck flanges 109. Extending axially between each of the flanges 109 is a wire rope 110 which carries a series of substantially aligned individual discs 111. The discs 111 are spaced at selected distances by means of links 112. Furthermore, each of the links 112 and disc 111 is covered by a Teflon sleeve 113.

The roller 107 is designed to bear against the surface of the fiberglass which is deposited upon the concave major surface 13, the recessed side wall 14 and the annular flange 15. It can be seen that the concave major surface 13 gradually merges into the side wall 14, and, therefore, the curvature of the roller 107 in the manner as illustrated in FIG. 8 is capable of bearing against this portion of the deposited glass. However, due to the sharp incline created by the upstanding plug 17, the roller 105 is designed to bear against the glass deposited on the side wall of the plug 17.

Basically, these rollers are designed to bear against the upper surface of the fiberglass in order to compact the fiberglass and urge the same into the resin layer. By urging the fiberglass into the resin, the resin matrix is forced upwardly so that a resin rich inner layer is formed in the end dome which is being constructed. This resin rich inner layer provides a fairly dense and liquid impervious structure. Furthermore, it obviates the problem of stray glass fibers or strands extending inwardly into the tank and causing the condition known as "wicking" where fluids are conducted through the voids in the wall which has just been formed. In addition, any entrained air is also forced to the inner surface. It has been found that this type of structure is very suitable in smoothing out rough surface imperfections and removing entrained air formed on the inner surface of the end dome 3.

Referring again to FIGS. 1 and 3, it can be seen that the arm 102 can be rotated and also shifted in a vertical plane. In addition, it is laid upon the surface of the mold 9 during rotation of the mold 9 so that it covers substantially the entire surface of the applied glass filament. When not in use, the arm 102 can be raised and rotated so that it can be lowered into a solvent tank 114 located at the outer end of the power housing 32.

The power housing 32 is also provided with a suitable control mechanism containing a conventional control programmer which is designed to perform each of the aforementioned functions in a pre-established timed relationship. Thus, filament will be applied to the surface of the side wall 14 in timed relationship to the application of the liquid matrix or resin. The mold 9 will be rotated at a proper speed to coincide with the application of the filament. In addition, during the application of the glass filament, the lance 35 may be reciprocated in a side-to-side motion so as to cover the entire surface of the mold 9. Simultaneously, the arm 102 is lowered so that the rollers 105, 107 engage the upper surface of the applied filament in order to smooth out any imperfections therein and remove entrained air during the process.

The end dome 3, which is formed in this operation, is more fully illustrated in FIGS. 28 and 29. The end dome 3 generally comprises a crowned side wall 115 having a laterally struck annular flange 116. The crowned side wall 115 is also provided with a centrally located aperture 118, which is locally reinforced by means of an annular inwardly struck flange 119.

The end dome 3 which has been formed includes a relatively thin resin-rich inner layer or so-called "resin float" on the inner surface of the crowned side wall 115. However, the annular flange 116 is under-impregnated and is essentially "dry." This type of construction in the flange 116 provides a porous and minimal base upon which additional filaments can be added during the final winding process. In addition, the flange 116 is formed with a taper extending toward the peripheral margin thereof. Thus, when the end domes 3 are held into engagement with the annular side wall 1, in a manner hereinafter described, additional filament windings and resin deposited on the flange will cause the flange 116 to become nearly completely integrated, structurally, into the entire tank structure.

After the end dome 3 has been formed and cured in the mold 94, it may be removed by means of a conventional hoist having a hook which can be inserted in the eyelet 19. By means of this construction, the upstanding plug 17 will be removed from the mold 9 and the enlarged base 18 will engage the underside of the end dome 3 thus formed, and remove the same from the mold 9. However, it should be understood that for removal of the end dome 3, the various sections 12 may be radially shifted for a short distance. Again, these operations are conventionally performed by the suitable control and programming mechanism (not shown) which may be provided with the apparatus.

Apparatus for producing storage tank side walls

The system A includes an apparatus S for forming the side wall 1 or so-called "shell" of the tank T is more fully illustrated in FIGS. 2, 5, 13–27 and 30–33. The apparatus S generally comprises an external cylindrical mold 120 having three arcuately shaped side wall sections 121, 122 and 123, more fully illustrated in FIG. 14. It can be seen that each of the sections 121–123 is arranged so that each constitutes a 120° arc of the total cylindrical mold 120.

The mold 120 is rotatably supported by a mold supporting frame 124 which generally comprises two pairs of longitudinally spaced hydraulically operated leveling devices 125 located at each of the transverse ends of the mold 120, as illustrated in FIG. 14. Each of the level devices 125 includes pistons 126 which carry support rollers 133, 134 at their upper ends by means of pivot pins 127. Thus, it can be seen that by actuation of the pistons 126, it is possible to raise the pivot pin 127 of each of the rollers 133, 134.

The mold 120 is provided with a pair of annular tracks 135 providing bearing surfaces for the rollers 133, 134, thereby enabling rotatable movement of the mold 120. By means of the above-outlined construction, it is possible to vertically adjust the axis of rotation of the mold 120 by actuation of the level devices 125. By elevating or extending each of the rollers 133, 134 through the same distance, the axis of rotation of the mold 120 can be shifted vertically without creating any horizontal displacement of the same. It can be seen that the rollers 133, 134 are extended or retracted along radial lines which originate from the axis of rotation. Furthermore, a desired amount of horizontal displacement can be obtained by raising one of the rollers 133, 134 slightly higher than the other.

However, in many cases it is undesirable to change the axial centerline of the tank being formed inasmuch as the remaining structure of the apparatus is not designed for vertical adjustment. Furthermore, in many cases, different diameters may be formed in the apparatus. It is desirable in these situations to maintain the axial centerline of the tank along the same horizontal plane in coaxial alignment with the lance to be hereinafter described. If the new mold which is employed in a tank forming process has a smaller diameter than a tank which was previously formed, the rollers 133, 134 are elevated.

By further reference to FIGS. 13 and 14, it can be seen that the arcuate section 122 is pivotally mounted on the arcuate section 121 by means of a longitudinally extending pivot rod 135' which is held by pairs of leaf-type hinges 136 rigidly secured to each of the two sections in the manner as illustrated in FIG. 16. Furthermore, a longitudinally extending sealing ring 137 is formed on one longitudinal margin of one of the sections 121, 122 and is located near the inner annular surface of the section. The sealing ring 137 fits within a mating groove in the opposing longitudinal margin of the other arcuate section. The arcuate section 123 is pivotally connected to the arcuate section 122 through the same type of construction as illustrated in FIG. 14.

The arcuate section 123, however, is not pivoted to the arcuate section 121 and is capable of being locked thereto by means of cam lock 138 illustrated in FIG. 15. It can be seen that a plurality of longitudinally aligned and mechanically interconnected cam locks 138 are provided for locking the three arcuate sections 121–123 in the form of the cylindrical mold. The lock 138 generally comprises a ring 139 which is engageable with a hook 140 formed on the arcuate section 123. A latch 141, through the action of a cam-like member 142, is capable of rigidly holding the hook 140 in a rigid position when the latch 141 is snapped into the position illustrated in the solid lines of FIG. 15. The dotted lines of FIG. 15 illustrate the movement of the latch and the retaining ring 139 in the manner as illustrated for locking the two sections 121, 123 together.

By reference to FIG. 28, it can be seen that the interior surface of the metal mold 120 is provided with a series of longitudinally spaced circumferential grooves 143 which are equally spaced with respect to each other. The groove 143 may have equal widths though in many cases the center groove has a larger width than the remaining grooves. A center groove may be provided with a larger width than the remaining grooves. For the purpose of the present invention, with an eight foot diameter tank, having a length of sixteen feet, it is preferable to employ five grooves which are six inches wide and approximately two inches deep. The number of grooves, however, is proportional to the length of the tank. These grooves are designed to form the tanks reinforcing ribs 2 or so-called "external hoops" to assure adequate buckling resistance in the finished tank wall structure. Furthermore, the ends of the mold 120 are provided with annular recesses 144 at each transverse end to receive the circumferential rim flanges of each of the end domes 3. Furthermore, external restraining lugs 145 are provided on each transverse end of the tank, the lugs being circumferentially spaced in order to hold the end domes 3 secure and accurately in position.

The metal mold 120 may also be provided with externally located heating elements (not shown) in order to heat the mold during rotation about its major axis. A heating blanket (not shown) may also be disposed around the extension surface to the mold 120. The heating of the metal mold 120, and for that matter the end dome molds as well, will provide a faster "flash-off" of solvents in the mold release agent and provide reduced viscosity in the gel coat and binder resin. In addition, the application of heat will substantially reduce care time.

Mounted rearwardly of the mold 120, in the manner as illustrated in FIGS. 2 and 14, are a pair of longitudinally spaced upstanding frames 150 and extending between the frames 150 and journaled therein at the upper ends of the frames 150 is an idler shaft 151 which carries a pair of forwardly extending arms 152. Rotatably mounted on the outer end of the arms 152 are driving rollers 153 which bear against the track 135 formed on the mold 120 for rotating the same. Rigidly mounted on the base of one of the frames 150 is a conventional variable speed electric motor 154 which is connected to a suitable source of alternating current electrical power source (not shown). The motor 154 drives a sprocket 155 which, in turn, drives a sprocket 156 on the idler shaft 151 by means of a drive chain 157. In like manner, the idler shaft drives each of the rollers 153 through drive chains (not shown). Thus, by varying the speed of the motor 154, it is possible to regulate the speed of rotation of the mold 120. However, in the formation of many side wall structures, particularly large diameter structures, it may be preferable to drive the mold 120 by means of the rollers 133, 134.

The arms 152 are provided with integrally formed rearwardly extending links 158 and connected to the frames 150 and the links 158, are actuating cylinders 159, which are, in turn, connected to a suitable control mechanism to be hereinafter described in detail. By actuation of the cylinders 159, it is possible to raise and lower the arms 152, and hence shift the drive rollers 153 out of engagement with the molds 120. Thus, when it is desired to open the mold 120, the cylinders 159 are retracted causing the arms 152 to be pivoted about the idler shaft 151 in order to avoid interference with the arcuate sections 121–123 forming part of the mold 120. After the arms 152 have been shifted to an upward position, the various cam locks 138 can be opened for opening the arcuate sections of the mold 120 to enable removal of a tank formed therein.

By further reference to FIGS. 2 and 13, it can be seen that the mold 120 is supported in a position where it is disposed in alignment with and abuts against a pair of tracks 160. Shiftably mounted on the left end of the track 160 with respect to the mold 120 is a heater carriage 161 which carries an insertion heater 162. The heater carriage 161 is movable into and out of the mold 120.

Also shiftable along the tracks 160 and being located on the right hand end of the mold 120, reference being made to FIG. 13, is a shiftable lance supporting carriage 163, and connected to the carriage 163 and being movable therewith is a creel supporting platform 164. The platform 164 carries a series of roving spools 165 for feeding individual roving strands to the carriage 163 generally comprises a U-shaped base frame 166. Extending between the flanges forming the U-shaped base frame 166 are a pair of axles 167 which carry rollers 168 for supporting the carriage 163 on the tracks 160. Shiftably disposed on the base frame 166 is an upper carriage frame 169 which is shiftable on the base frame 166 by means of pairs of roller bearings 170. The upper carriage frame 169 carries a control panel 171 for controlling the various operations of the components forming part of the side wall forming apparatus S. The control panel 171 is suitably connected to a control mechanism and a control programmer (neither illustrated nor described in detail herein, inasmuch as this structure is conventional). The upper carriage frame 169 is powered in its shifting movement with respect to the base frame 166 by means of a hydraulic cylinder 172, the latter being actuated by the control mechanism.

The upper carriage frame 169 carries a lance supporting housing and is provided with an air operated filament feeding system 173. The feeding mechanism 173 comprises a manifold 174 having a series of filament guides 175. Each filament guide 175 is designed to receive the individual roving strands from the creel supporting platform 164 and each guide is associated with a pair of metering rollers 176. The rollers 176 are rotatably supported on the carriage frame 169 and are driven by a conventional alternating electrical motor 176' through a gear train 177. Each filament guide is disposed within an air chamber 178 and is provided with an open discharge 179 in an area proximate a venturi throat 180 formed in the air chamber 178. Each of the chambers 178 receives air under pressure through air lines 181, in the manner as illustrated in FIG. 19.

The filament which is moved into the filament guides 175 through the metering rollers 176 is sucked into the venturi throat by means of the air under pressure introduced into the chambers 178. Each venturi throat 180 is connected to a filament feeding tube 186 located in a lance 183. The lance 183 comprises a cylindrical mounting hub 185 which carries the series of filament feeding tubes 186. A conventional guillotine type cutter 182 is located in the manifold 174 and extends through each of the tubes 186 in order to sever strands at desired time intervals. It can be seen that the filament strands are essentially drawn into the tubes 186 by means of the high pressure area in the venturi throat 180. The proper tension is maintained on the strands by means of the metering rollers 176. After a complete winding operation has been performed, the various strands in the tubes 186 can be severed by means of the conventional cutter 182.

The feeding tubes 186 terminate in feeding heads 187 at various distances along the length of the lance 183.

Generally, a feeding head 187 is provided for each circumferential groove 143 formed in the mold 120. Furthermore, each feeding head is designed to be disposed in approximate circumferential alignment with each of the grooves 143 and end dome flanges 116, when the lance 183 is completely disposed within the mold 120. The lance 183 also carries a resin supply tube 188 which is provided along its length with radially extending resin feeder pipes 190. Generally, a resin feeder pipe 190 is provided for each filament feeding head 187. The resin feeder pipe 190 may be located along side of the feeding head 187 or it may be located in an angular position. The glass and the resin are generally laid or deposited simultaneously. However, the glass and resin may be deposited in sequential operations. When sequential operations are employed the resin is generally sprayed first and then followed by the application of glass; though the glass could first be applied and followed by a spray of resin.

The resin feeder pipes may be pivotally mounted on the resin supply tube 188 in any conventional manner so that the pipes may be swingable in order to enter through the aperture 118 formed in the end dome 3. Furthermore, in place of using pivotal pipes, it is also possible to use extensible resin feeding heads in order to accomplish the same result. In this construction, the resin feeding head can be retracted when the lance 183 is inserted into the aperture 118 of the end dome 3. After the lance has been inserted for the desired length, the resin feeding heads can then be extended as desired.

A conventional valve structure (not shown) is connected to the resin supply tube 188 and is mounted on the upper carriage frame 169 for controlling the flow of resin. The resin supply line 188 is connected to a suitable source of liquid resin 195 by means of a resin tube 196. A suitable pump 197 connected to the source of resin 195 is also provided for pumping liquid resin to the resin supply tube 188. With many catalyzed resins, it is preferable to use a pressurized container.

The various filament feeding heads 187 are connected to the respective filament tubes 186 in such manner that they are pivotal with respect to the feeding tubes 186. Any conventional mechanism may be employed for accomplishing this pivotal mounting. Furthermore, filament communication will be maintained between the tubes 186 and the feeding heads 187. A conventional ball socket structure having the proper apertures may be employed for this purpose. Thus, when the lance 183 is inserted in the aperture 118 of the dome 3, the feeding heads 187 will pivot upwardly so that they are substantially parallel with the tubes 186.

By reference to FIG. 13, it is to be noted that the heads 187 fold up toward the center of the lance 183. In other words, the heads 187 at the left-hand end of the lance 183 will pivot upwardly to the left. After the lance 183 has been inserted through the aperture 118, the feeding heads can then fall to their fully extended position in the manner as illustrated in FIG. 13. The lance is also shifted back slightly in order to permit the endmost heads 187 to fall to their fully extended positions. Furthermore, it should be noted that the feeding heads 187, when extended, terminate in a position which is slightly above the inner wall of the mold 120.

It should be recognized that the feeding heads 187 may also be extensible and retractable. By means of this construction, the feeding heads would be retracted while the lance 183 is inserted into the mold and extended after the lance has been inserted to the proper position. Furthermore, it is also possible to employ a lance which is shiftable toward the annular side wall after the lance has been inserted into the mold. For example the aperture 118 could be enlarged and the lance 183 could be inserted in such manner that the feeding tubes 186 pass through the aperture 118. After all of the tubes 186 have passed through the aperture 118, the lance is then lowered so that the terminal ends of the feeding heads 187 will be closely disposed to the surfaces of filament deposition.

As a modification to the above described system for producing the tank side wall T, it is also possible to add particulate matter such as sand, or other conventional filler material. The addition of particulate matter, such as sand, will offer a substantially superior compressive strength and good rigidity, somewhat analogous to concrete type structures. Furthermore, the addition of particulate matter enables increased strength under bending loads. In addition, resin-bound sand composites inherently include substantial resistance to flex cracking. The sand aggregate can be introduced and positioned at any rate and volume required in order to achieve the optimum loading fraction. Thus, it can be seen that the sand enhances the flexural modulii while the binder resin exhibits the specific adhesion required and the resistance to interlaminar sheer that can be obtained within the desired economic limits.

The preferred particulate material employed in the present invention is sand. However, many other materials may be used, such as particulate silica, small hollow spheres of various material and carbon and graphite. If, for example, weight is a material factor in the formation of the tank, vermiculite or small hollow spheres of various materials such as glass or phenolic resin would be preferred. The particle size of the particulate matter can be selected within fairly wide limits with the following sizes being representative rather than limiting. A large particle in the range of from 8 to 64 mesh and a small particle in the range of from 100 mesh to 5 microns have been found to produce structures having the desired characteristics. In addition, it has been found that the amount of sand can range from 0 to 90% of the overall weight of the tank.

The particulate matter would be introduced into the resin-glass composition by means of a separate nozzle and feeding tube (not shown) included on the lance. The feeding head would be similar to the feeding head 187 and closely disposed to the surface of filament deposition. It is possible to add the sand in various ways in order to achieve the desired result. For example, all of the sand could be added after the addition of the resin. Typically, it is desirable to add the sand either simultaneously with the resin or after the application of the swirl patterns. The sand being heavier than the resin will actually replace the resin and move toward the exterior surface of the structure being formed. In essence, the resin would be forced inwardly in order to produce a more resin rich layer on the interior surface. In addition, the sand also packs the glass into the resin matrix.

Inasmuch as the sand would move toward the exterior surface of the structure, the sand, in essence, forms a protective layer thereby rendering the structure more resistant to abrasive action. The sand also provides a rather pleasant aesthetic appearance. It can be observed that inasmuch as the particulate matter is relatively inexpensive compared to the overall cost of the glass and resin matrix, substantial economies are achieved by adding the particulate matter without affecting the overall structural parameters of the tank. In addition, as indicated previously, the sand enhances certain structural parameters of the tank. Accordingly, the desired structural parameters would be taken into consideration along with the economic factors in order to determine the amount of particulate matter which is added to the structure. It should also be observed that sand or other particulate matter could be added in the formation of the end domes in the same manner as previously described.

OPERATION

In the manufacture of the tanks T, each of the end domes 3 is first prefabricated in the circular mold 9. The mold is rotated about its axis of rotation and the speed thereof is automatically programmed to coincide with the rate at which the glass filaments are laid therein. During the application of the glass filament, the mold is also warmed for achieving better wetting and shorter cure time. Initially, a thin film of solvent dispersed mold release is sprayed on the crown surface of the mold 9. The heat from the mold aids in the acceleration of the solvent removal. Thereafter, a resin gel coat is sprayed over the entire mold surface. This resin gel coat may be pigmented with an inert colloid for improved corrosion resistance and appearance.

At this point, it should be recognized that the mold could be engraved to produce raised letters or other indicia which is ultimately transferred to the end domes 3. After a sufficient time to allow the gel film to stiffen slightly, generally a few minutes, the glass filaments are laid down in a spray of catalyzed binder resin. Layers of filament are also heavily deposited around the base of the upstanding plug 17 so that the entire end dome, when complete, will have a locally reinforced central aperture 118. It may be desirable to employ two end dome forming apparatus E in order to keep pace with the molding cycles of the tank shell or side wall. Both apparatus could be operated from the same control programmer.

In the formation of the tank T, the end domes 3 which have been formed are secured to the transverse ends of the mold 120 and retained in place by means of the external restraining lugs 145.

The entire carriage 163 is then shifted to the left so that the lance extends through the aperture 118 formed in the end dome 3 and into the mold 120 in the manner as illustrated in FIG. 2. It should be recognized that as the lane 183 extends through the aperture 118, the various feeding heads 187 will be pivoted upwardly and then will extend to the lower position as they pass through the aperture 118. The carriage is automatically stopped when the feeding heads have reached a position where each feeding head is disposed in proximate relation to a groove 143 formed in the mold interior surface. The same is also true of the resin feeding heads 187. The lance 183 may also carry high-intensity lights to allow an operator to view the process and monitor the various operations.

With the prefabricated end domes 3 locked in place, and the lance 183 inserted for its full length into the tank mold interior, the mold 120 is rotated at a relatively slow speed. A solvent dispersed mold release is sprayed only on the inner metal surface of the mold 120 and not on the circumferential flanges 116 of the end domes 3. An exterior gel coat is thereafter applied and allowed to stiffen. The speed of rotation of the mold 120 is then increased to preferably at least 15 revolutions per minute where each of the filament nozzles will lay circumferential rovings into each of the grooves 143 simultaneously. However, the speed of rotation of the mold 120 is primarily a function of the mold radius. The circumferential strands are laid approximately side-by-side in the manner as illustrated in FIGS. 23 and 24 until a uniform coverage of the entire width of the groove is attained. During the rotation of the molds 120, the lance 183 is reciprocated by means of the hydraulic cylinder 172. Again, these respective movements are controlled by the control mechanism and the programmer, which form part of the apparatus of the present invention. This type of filament laying is continued until an initial high-density structural layer in the form of flat rings is obtained in each of the grooves 143. Thereafter, the speed of rotation of the mold 120 is decreased and the glass filaments are caused to lay in overlapping continuous flat spirals until the groove is entirely filled in the manner as illustrated in FIGS. 24 and 25. This additional layer builds a low-density "core" in the groove which is flush with the interior annular surface of the mold. Actually, this additional core merely provides a build-up and does not necessarily provide significant structural ability which is better achieved by the circumferential windings. The speed of rotation of the mold 120 is then increased again to its original velocity to lay down a complete and continuous layer of circumferential windings over the entire interior mold surface. The lance 183 is now reciprocated for a greater distance so that all parts of the mold interior surface are covered by at least one of the feed nozzles. During the laying of the continuous filament, a light spray of liquid catalyzed binder resin may also be applied. Consequently, air entrapment and air inclusion will be floated to the inner surface and continue to be removed as more of the fiberglass and resin are applied.

After laying down the surface shell of circumferential strands, the mold is again reduced in speed and flat spiral (core) deposition is resumed. This core deposition takes place over the entire inner surface of the mold and also over the end dome flanges 116. This application which is illustrated in FIGS. 26 and 27 is continued until the design shell-wall thickness has been achieved. All of the strands of glass roving are then severed and this may be accomplished by use of the cutter 181. The speed of rotation of the mold 120 is again increased substantially and sufficient additional liquid resin is applied to form a very thin, unbroken, glass-like resin float on the inner surface.

The three elements of FIG. 28 more fully illustrate the manner in which the end dome 3 is wound into the side wall 1. In FIG. 28a, the cross sectional view of the mold 120 is illustrated. FIG. 28b discloses a portion of the side wall 1 of the tank T having been laid in the mold 120. Finally, FIG. 28c discloses the technique for incorporating the flanges of the end dome 3 integrally into the side wall 1.

It should also be recognized that it is possible to accomplish the winding techniques of both filament winding and flat spiral deposition by regulating the feed rate of the filament as opposed to regulating the speed of rotation of the mold. In this latter embodiment, it is possible to regulate the metering roller, which will in turn adjust the amount of filament deposited in the mold. Thus, when it is desired to lay the filament in the form of spiral core deposition, the filament rate is materially increased. In like manner, when it is desired to employ straight-line filament winding techniques, the speed of filament deposition is substantially reduced or mold rotational velocity increased so that the filament is applied at the same rate of peripheral speed of the mold. In many applications, this latter technique is preferred inasmuch as the speed of filament feed must always be monitored and adjusted to compensate for the thickness of the side wall in order to insure a compatability of side wall speed with filament deposition rate. The mechanism for accomplishing this monitoring control function is conventional and is mounted in the carriage 163.

Centrifugal force serves to compact the glass-resin composites and also aids in retaining this glassy inner surface which is important for maximum liquid retention and relative impermeability. This resin rich inner layer serves as an excellent liner for resistance to corrosion. Furthermore, the end dome rims are now an integral, merged-in part of the whole tank structure with a resin-rich inner surface now extended to bond with that of the prefabricated end domes 3. In essence, a unitized one-piece structure with an unbroken inner "skin" is formed.

After allowing sufficient time for the resin to cure, which is about 20 minutes, the mold is stopped and the end dome restraining lugs are relieved. The mold is unlocked through the action of the cam locks 138 and swing open so that the finished tank can be lifted out. Thereafter, new end domes can be locked in place and the operation started again into another tank-building cycle. In essence, it has been established that the tank-building operation requires approximately 75 minutes, which of course, depends primarily upon the size of the tank being constructed and also upon the resin-catalyst system and the size of the rovings employed.

After the tank has been removed from the mold 120, tank finishing operations are thereafter performed. End dome caps 210 are inserted in each of the end dome apertures 118 in the manner as illustrated in FIG. 29. Each of the caps is preferably formed with outwardly extending plugs 211 for engagement by a conventional hook and crane for lifting the finished tank T. Preferably, the end caps 210 are formed of a reinforced plastic material or other similar corrosion resistant material.

Five of the reinforcing ribs formed on the tank wall may be drilled at their upper end in the manner as illustrated in FIG. 29. In the center aperture, a filling pipe having an approximate 4 inch diameter is bonded in the aperture and extends almost to the bottom wall of the tank T. In two apertures located on opposite sides of the filled pipe are inserted suction pipes 213, the latter also being bonded in the aperture and plugged as desired. In the two remaining apertures, threaded reducing collars 214 are inserted and provided with plugs 215. It is preferable to make the full depth pipes as illustrated in FIG. 31 from reinforced plastics for structural continuity and optimum corrosion resistance. In addition, the pipe fittings and reducing collars should preferably be made from polyvinylchloride or similar molded material. However, they can be made from corrosion-resistant metals, since they are in essence, galvanically isolated. The full depth pipes 213 can be manufactured in accordance with the method described in my copending application Ser. No. 633,146, filed Apr. 24, 1967, and which relates to a method and apparatus for producing filament wound pipe.

MODIFIED SIDE WALL FORMING APPARATUS

It is possible to provide a modified form of apparatus S' for forming the side wall 1 or so-called "shell" of the tank T. This apparatus S' is similar to the apparatus S and is more fully illustrated in FIGS. 30 and 31. The apparatus S' includes a mold 120 in a manner similar to the apparatus S. Furthermore, a lance supporting carriage 250 which is similar to the carriage 163 is provided. However, in the apparatus S', two transversely spaced creel supporting platforms 251 which are similar to the platform 164 are provided. Each of the platforms 251 carries roving spools 252 for feeding the individual roving strands to the carriage 250 in a manner to be hereinafter described in more detail. It can be seen that the platforms 251 are shiftable along a trackway 253, which is located in a direction transverse to the rails 160. The individual platforms 251 are each shiftable into alignment with the carriage 250. Thus, as one platform is being employed in the production of a side wall, one of the remaining standby platforms 251 can be readied for the next operation. Each of the platforms 251 is provided with suitably apertured filament programming cards 254 for properly threading each of the filament strands ultimately to pass into the lance. A suitable prime mover (not shown) can be provided for shifting each of the platforms 251.

The carriage 250 generally comprises a lower carriage frame 255 which is substantially similar to the base frame 166 of the carriage 163. The lower carriage frame 255 carries an upper carriage frame 256 which suitably holds a control panel 257 for controlling the various operations of the components forming part of the side wall forming apparatus S'. Extending forwardly of the upper carriage frame 256 is a lance support 258, which suitably holds the lance 259. The lance 259 is substantially identical to the previously described lance 183. A lance supporting housing 260 is removably secured to the upper carriage frame 256 in the manner as illustrated in FIG. 31. Each of the platforms 251 is provided with forwardly extending housing support frames 261. It can be seen that the housing 260 is substantially identical with the housing 173 in the apparatus S; but that each of the housings 260 is shiftable with the respective platforms 251. Thus, when the spools 252 of one platform have become emptied, the next adjacent platform 251, which has previously been prepared, is shifted into alignment with the carriage 250. This particular platform 251 carries its own lance supporting housing 260, which is shifted to and properly aligned with the upper carriage frame 255. Suitable limit switches (not shown) may be provided in order to provide assurance that the lance supporting housing 260 is properly aligned with the lance 259 and is securely held in place. The lance 259 also comprises a mounting hub 262, which is removably attached to a mating hub 263 on the lance supporting housing 260. Generally, each of the individual filament strands will be cut after a particular operation. Thus, when a tank is completed the guillotine-type cutter 182 can then be actuated to sever the filament strands. By reference to FIGS. 30 and 31, it can be seen that it is a relatively simple and convenient matter to again force each of the new filament strands from the new spools 252 into each of the respective tubes 186 after the housing 260 has been secured to the lance 259.

By reference to FIG. 32, it can be seen that each creel supporting platform 251 is connected to and removable with the carriage 250. The carriage 250 is shiftable along the set of tracks 160 and each of the creel supporting platforms is shiftable along the set of tracks 253 which are perpendicularly located with respect to the tracks 160. Thus when it is desired to operatively attach a new creel supporting platform 251 to the carriage 250, the desired creel supporting platform 251 is shifted along the tracks 253 into alignment with the tracks 160. At this point, a conventional wheel shifting mechanism (not shown) is employed to raise one set of wheels and lower a second set of wheels to thereby enable the creel supporting platform 251 to shift along the tracks 160. This type of wheel shifting structure is well known in the art and is similar to the type used on mining freight cars. Accordingly, it can be observed that each creel supporting platform 251 is provided with a first set of wheels shiftable along the tracks 253 and a second set of wheels which are perpendicularly located with respect to the first set of wheels.

It should be understood that changes and modifications in the form, construction, arrangement and combination of parts presently described and pointed out may be made and substituted for those herein shown without departing from the nature and principle of our invention.

We claim:

1. The method of making filament reinforced tubular structures comprising inserting a filament feeding member having a plurality of filament feeding heads into a cylindrical tubular die, said filament feeding heads being co-extensive with said tubular die, rotating said die relative said filament feeding member, applying continuous filament strands issuing from said filament feeding heads to the interior peripheral surface of said tubular die at a rate at least as great as the peripheral movement of said tubular die, oscillating said filament feeding member while supplying said tubular die with said filament strands, adding a resin matrix to said filament strands and curing said resin matrix to form a composite structure of continuous filament strands in the resin matrix.

2. The method of claim 1 further characterized in that the resin matrix is simultaneously applied with the filament strands.

3. The method of claim 1 further characterized in that the relative speed of rotation between said die and the means for feeding the filament strands is sufficient to cause the strands to be centrifugally applied to the die and retained therein.

4. The method of claim 1 further characterized in that particulate matter is added to the resin-strand composition.

5. The method of claim 1 further characterized in that the method comprises first centrifugally applying the filament strands to said die in side-by-side relationship to form a filament wound structure, and then increasing the rate of applying filament strands to said die forming element to cause the filaments to be applied to the die in consecutive swivel patterns.

6. The method of claim 1 further characterized in that the method comprises first centrifugally applying the filament strands to said die in side-by-side relationship to form a filament wound structure, then increasing the rate of applying filament strands to said die to cause the filaments to be applied to the die in consecutive swivel patterns, and thereafter increasing the rate of speed existing between said filament feeding member and said die to again centrifugally apply the filament strands to said die in side-by-side relationship.

7. The method of claim 5 further characterized in that said die is rotated and said filament feeding member is reciprocated.

References Cited

UNITED STATES PATENTS

| | | | |
|---|---|---|---|
| 3,012,922 | 12/1961 | Wiltshire | 156—74 |
| 3,483,054 | 12/1969 | Bastone | 156—175 |
| 2,995,175 | 8/1961 | Lundskow | 156—429 |
| 3,379,591 | 4/1968 | Bradley | 156—425 |
| 3,489,626 | 1/1970 | Rubenstein | 156—173 |
| 3,130,928 | 4/1964 | Daley | 156—433 |
| 3,120,689 | 2/1964 | Drummond | 156—166 |

ROBERT F. BURNETT, Primary Examiner

D. J. FRITSCH, Assistant Examiner

U.S. Cl. X.R.

156—169, 173, 175, 425, 433, 446; 220—3, 72, 83; 226—97